United States Patent

Hsiao et al.

[11] Patent Number: 6,041,452
[45] Date of Patent: Mar. 28, 2000

[54] WATER-SAVING TOILET

[76] Inventors: Chien-Liang Hsiao, No. 59-10, Kou Qian Lane, Lu Kang Township, Chang Hua Hsien; Pang-Yen Tsai, No. 73-1, Fu Hsin Street, Taichung, both of Taiwan

[21] Appl. No.: 09/221,087

[22] Filed: Dec. 24, 1998

[51] Int. Cl.[7] ................................................ E03D 1/14
[52] U.S. Cl. .................... 4/326; 4/324; 4/405; 4/413; 4/415
[58] Field of Search ............................... 4/324–327, 393, 4/378, 405, 412, 413, 414, 415

[56] References Cited

U.S. PATENT DOCUMENTS

| | | | |
|---|---|---|---|
| 2,781,521 | 2/1957 | Schmidt et al. | 4/393 |
| 3,590,396 | 7/1971 | Graziosi | 4/393 |
| 3,913,149 | 10/1975 | Brinton | 4/326 |
| 5,042,096 | 8/1991 | Bolli | 4/326 |
| 5,414,877 | 5/1995 | Tsai et al. | 4/325 |
| 5,483,706 | 1/1996 | Tsai et al. | 4/325 |

*Primary Examiner*—Henry J. Recla
*Assistant Examiner*—Tuan Nguyen
*Attorney, Agent, or Firm*—Harrison & Egbert

[57] ABSTRACT

A toilet water tank is provided with a water discharging seat which is in turn provided in the top thereof with an upright tube, a high water discharging port and a low water discharging port. The high and the low water discharging ports are movably covered with a cover respectively. The cover is fastened with the upright tube which is provided with a guide wheel member. A flush handle is located outside the toilet water tank such that the flush handle is connected with a control rod extending to the water discharging seat for locating two chains between the two covers and the control rods. The chains are located by the clamps such that the chains can be installed or replaced with ease and speed.

1 Claim, 8 Drawing Sheets

WATER-SAVING TOILET

FIELD OF THE INVENTION

The present invention relates generally, to a toilet, and more particularly to a water-saving toilet.

BACKGROUND OF THE INVENTION

As shown in FIGS. 1–3, a water tank 10 of the prior art toilet has a flush handle 11 for controlling two pull rods 12, 122, which are capable of actuating two chains 13 which are in turn fastened with two covers 16 and 17 of two water discharging tubes 14 and 15. The chains 13 are provided at both ends thereof with a C-shaped ring 18 in contact with the pull rods 12, 122 and the covers 16 and 17.

In this prior art toilet, both ends of the chains 13 cannot be located easily and precisely with the pull rods 12, 122 and the covers 16 and 17, and that the chains 13 cannot be easily adjusted in length in accordance with the distances between the pull rods 12, 122 and the covers 16, 17, and further that the C-shaped ring 18 is vulnerable to damage or deformation.

SUMMARY OF THE INVENTION

The primary objective of the present invention is therefore to provide an improved toilet water tank free from the drawbacks of the toilet water tank of the prior art described above.

The objective, features, functions, and Advantages of the present invention will be readily understood upon a thoughtful deliberation of the following detailed description of the present invention with reference to the accompanying drawings.

DETAILED DESCRIPTION OF THE INVENTION

Figure 1:
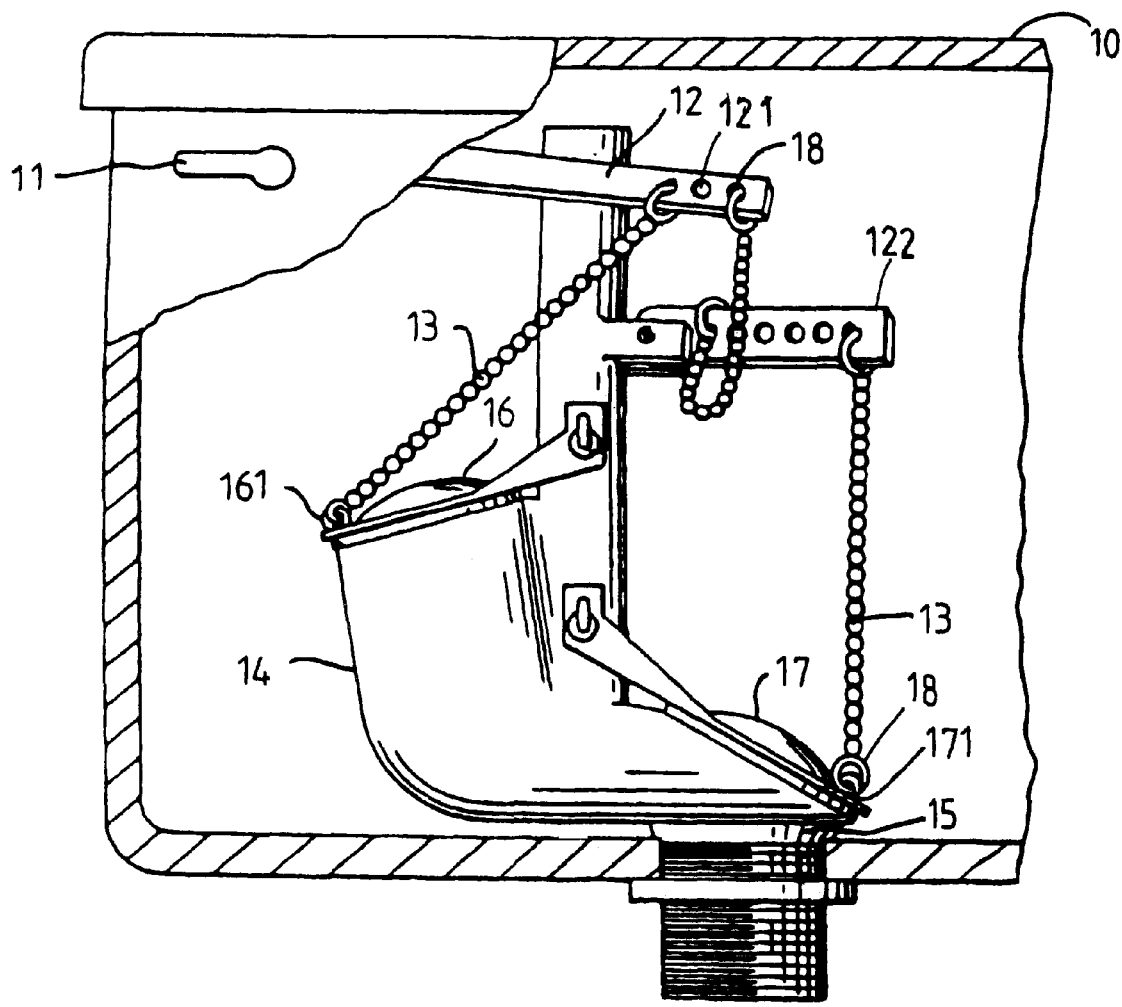
FIG. 1 shows a schematic plan view of a toilet water tank of the prior art.
Figure 2:
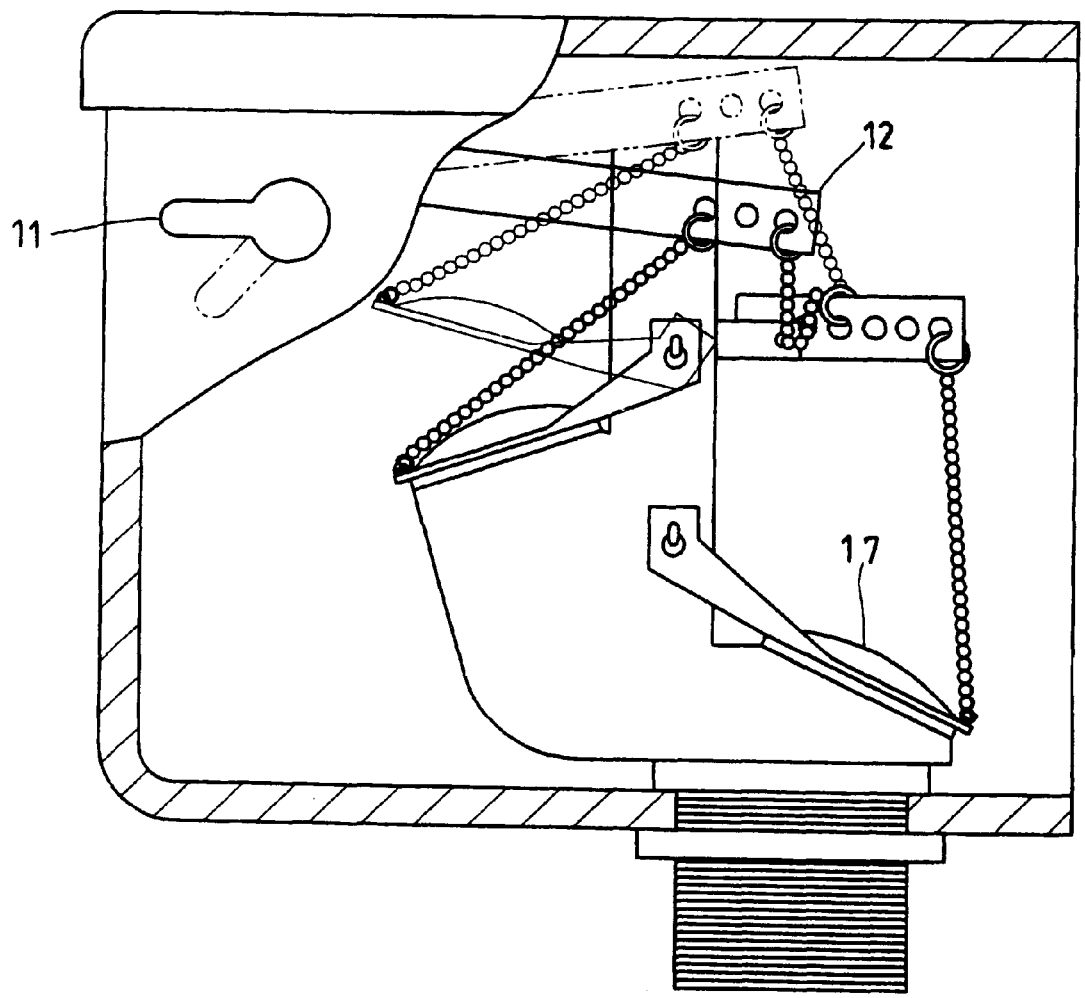
FIG. 2 is a schematic plan view showing the discharge of a small amount of water by the toilet water tank of the prior art.
Figure 3:
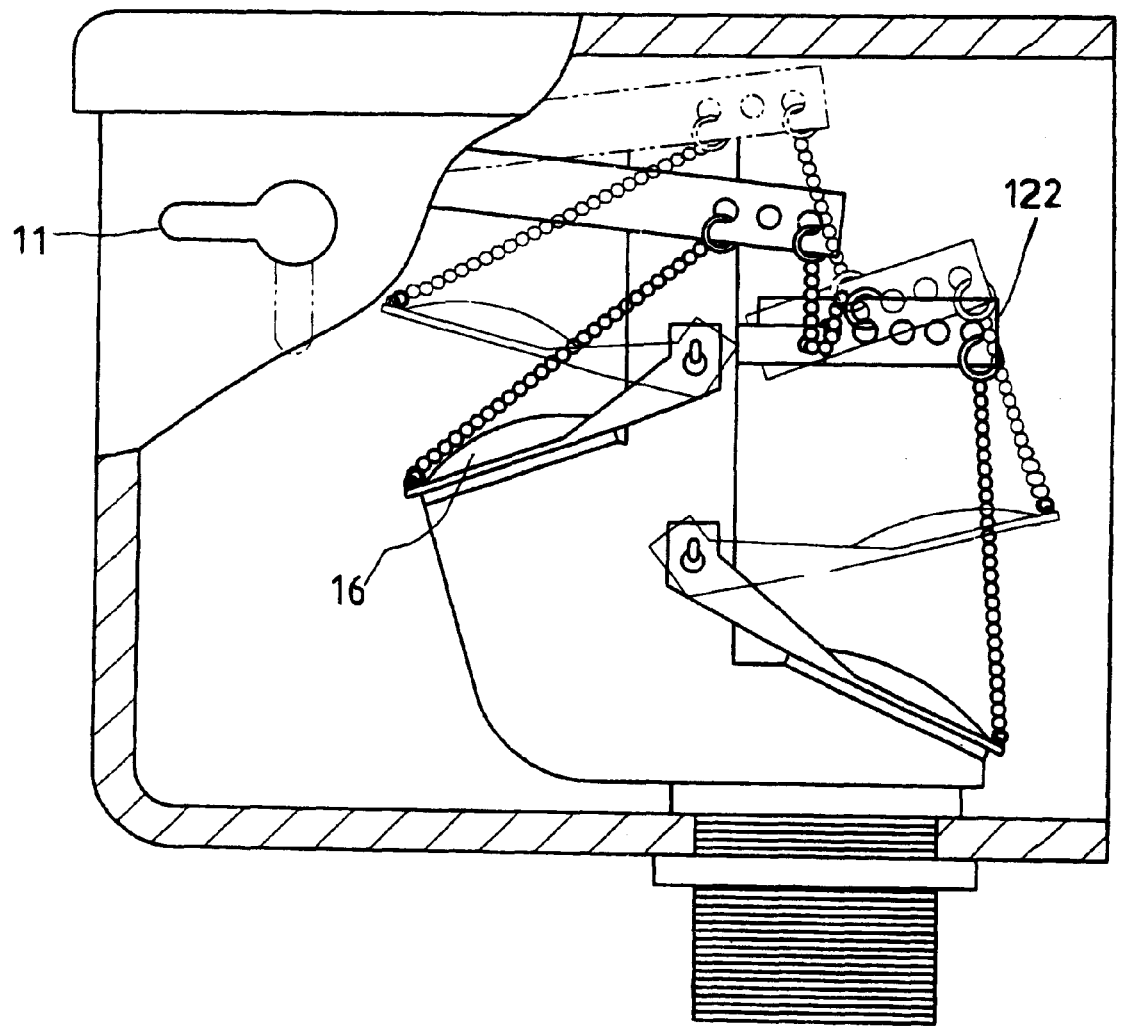
FIG. 3 is a schematic plan view showing the discharge of a large amount of water by the toilet water tank of the prior art.
Figure 4:
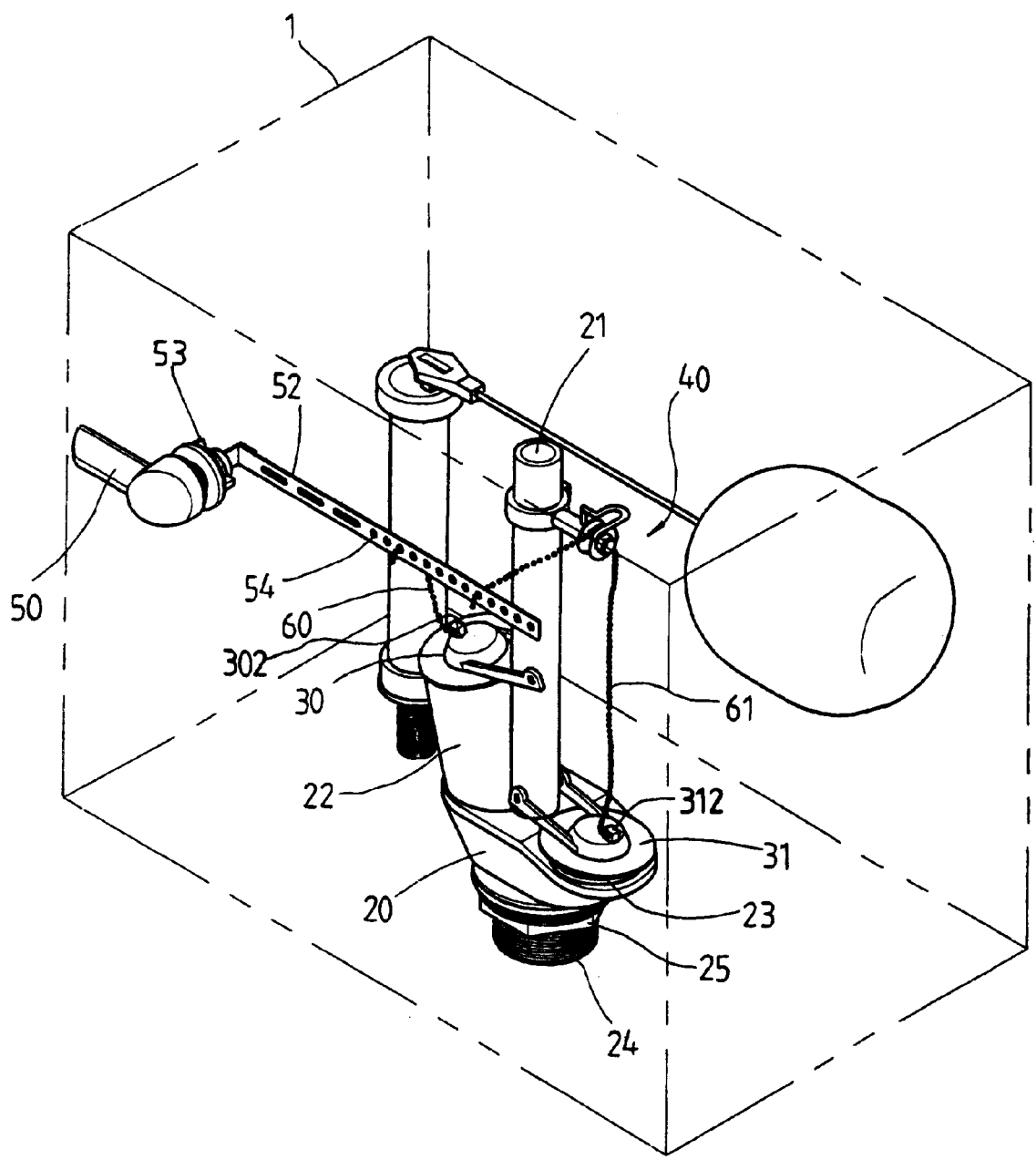
FIG. 4 shows a perspective view of the present invention.
Figure 5:
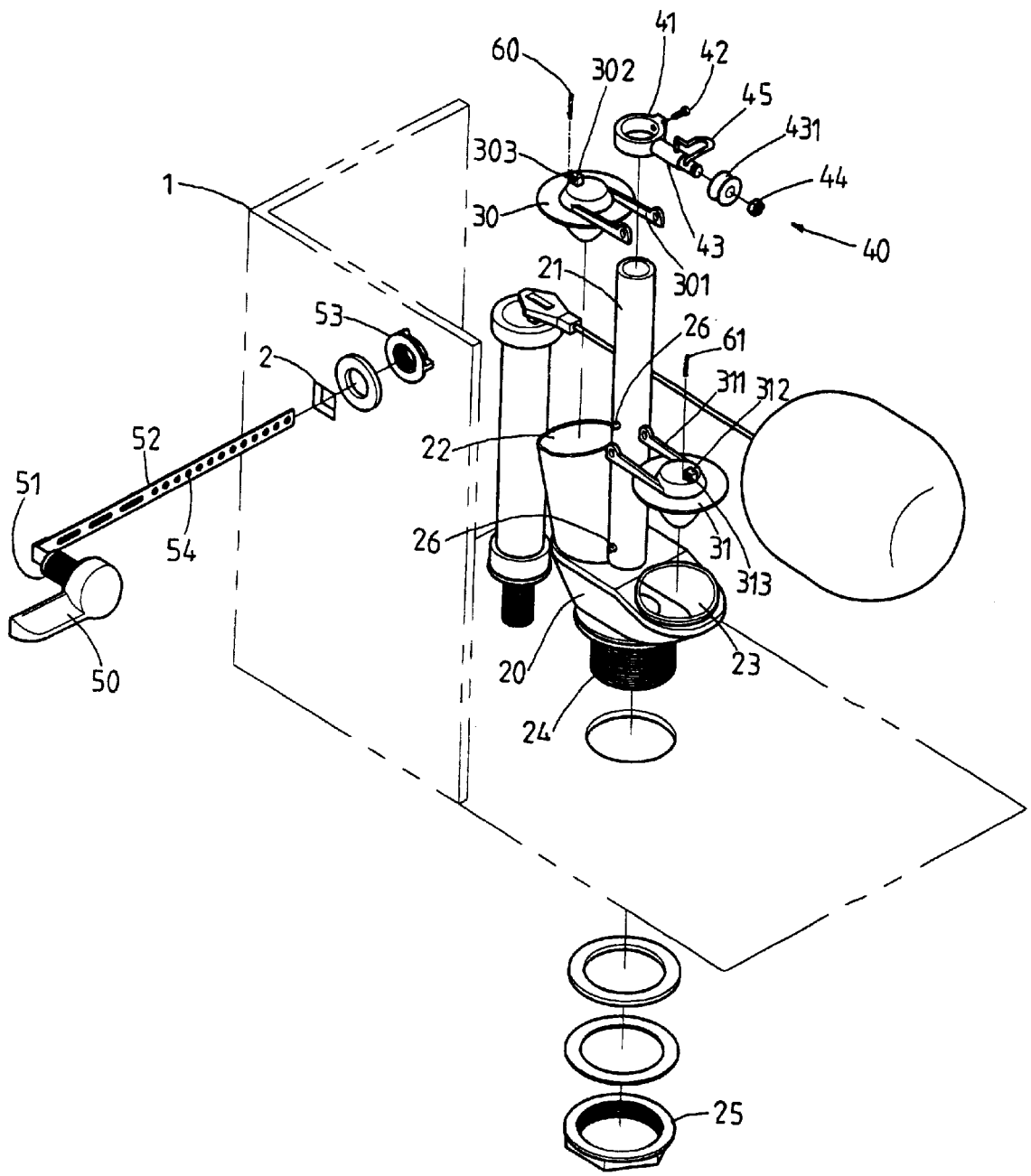
FIG. 5 shows an exploded view of the present invention.

As shown in FIGS. 4 and 5, a toilet Water tank of the present invention is composed of the component parts which are described hereinafter.

A water discharging seat 20 is provided in the center thereof with an upright tube 21, a high water discharging port 22, and a low water discharging port 23. The water discharging seat 20 is provided in the bottom thereof with a threaded tube 24 which is engaged with a nut 25. The threaded tube 24 is intended to connect the water discharging tube with the toilet. The two side walls of the upright tube 21 are provided with two columnar bodies 26 contiguous to tire high water discharging port 22 and the low water discharging port 23.

Two covers 30 and 31 are joined respectively with the high water discharging port 22 and the low water discharging port 23. The two covers 30 and 31 are provided with two parallel rod bodies 301 and 311 for locating the covers 30 and 31 such that the ends of the rod bodies 301 and 311 are engaged with the two columnar bodies 26 of the upright tube 21. The covers 30 and 31 are further provided in the center of the top thereof with a protrusion 302, 312. The protrusions 302 and 312 are provided with a cross through hole 303, 313.

A guide wheel member 40 has a ring body 41 which is fitted into the upright tube 21 for locating the upright tube 21 in conjunction with a bolt 42. The ring body 41 is provided in the outer wall thereof with a rod body 43 which is fastened pivotally at one end thereof with a guide wheel 431 which is located by the rod body 43 in conjunction with a nut 44. The top edge of the rod body 43 is inserted into a locating frame 45. The guide wheel 431 has an axis of rotation which is in line with a longitudinal axis of said rod body 43.

A flush handle 50 has a connection seat 51 and a control rod 52. The connection seat 51 is located in a through hole 2 of the water tank 1 so as to extend the control rod 52 to a position which is away from the top of the water discharging seat 20 by a distance. The connection seat 51 is engaged with a nut 53 for locating the flush handle 50. The control rod 52 is provided in the surface thereof with a plurality of locating holes 54. The guide wheel 431 has an axis of rotation which is transverse to an axis about which the flush handle 50 pivots.

Two chains 60 and 61 are provided such that the bottom end of the chain 60 is put through the cross through hole 303 of the protrusion 302 of the cover 30. The top end of the chain 60 is put through the locating hole 54 of the control rod 52. The bottom end of the chain 61 is put through the cross through hole 313 of the protrusion 312 of the cover 31, whereas the top end of the chain 61 is put through the locating hole 54 of the control rod 52 via the guide wheel 43 of the guide wheel member 40.

Figure 6:
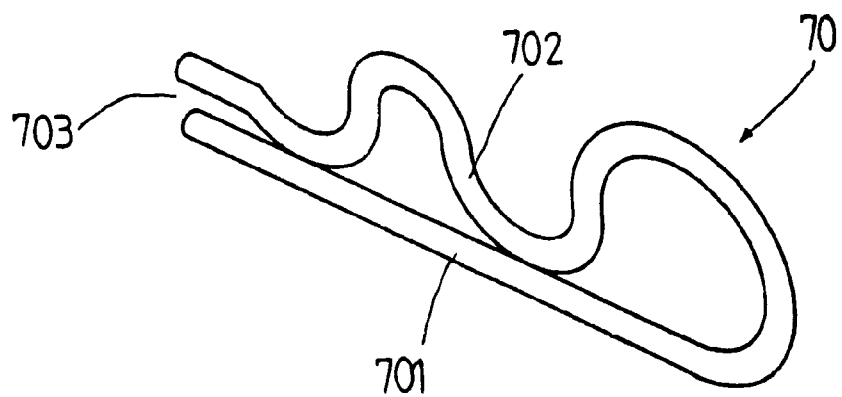
FIG. 6 shows a perspective view of clamps of the present invention.
Figure 7:
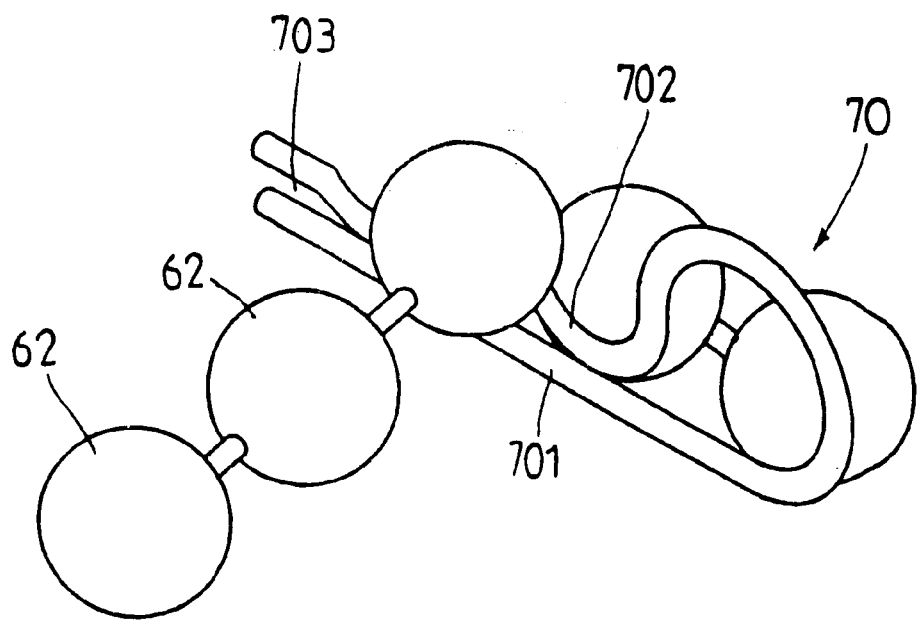
FIG. 7 shows a perspective view of the clamps in conjunction with chains of the present invention.

A plurality of clamps 70 are provided respectively with a flat straight portion 701 and a curved portion 702 in contact with the flat straight portion 701, as shown in FIGS. 6 and 7. A guide slot 703 is formed by the flat straight portion 701 and the curved portion 702. The clamps 70 are engaged with two ends of the two chains 60 and 61 such that the clamps 70 are located between two bead bodies 62, and that the control rods 52 are connected with the covers 30 and 31.

The present invention has advantages over the prior art. Such advantages are described hereinafter. The straight portion 701 and the curved portion 702 define a looped area inwardly of the guide slot 703. The looped area extends over and around a wire positioned between the bed bodies 62. The looped area has a diameter less than a diameter of a bead 62.

Figure 8:
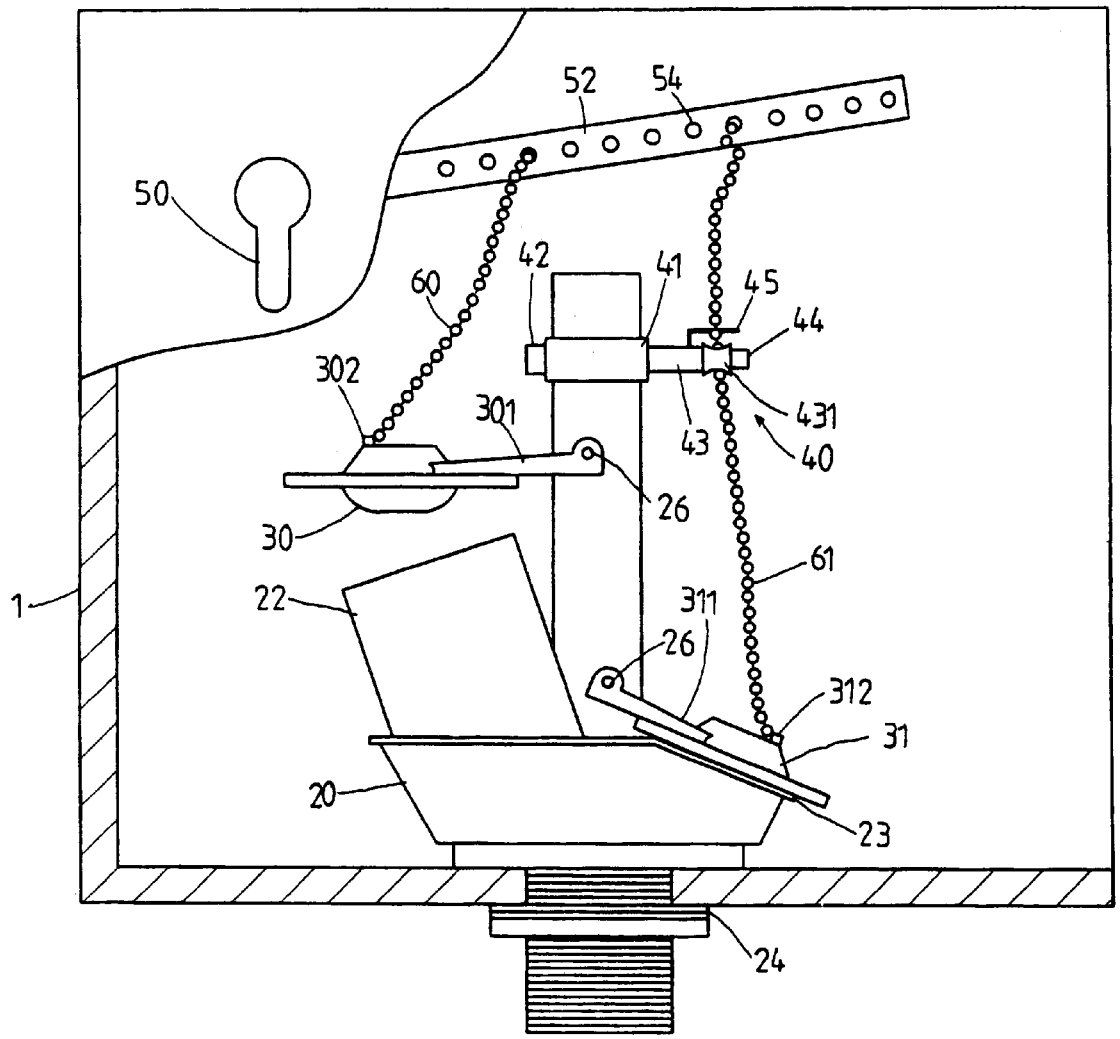
FIG. 8 is a schematic plan view showing the discharge of a small amount of water by the present invention.
Figure 9:
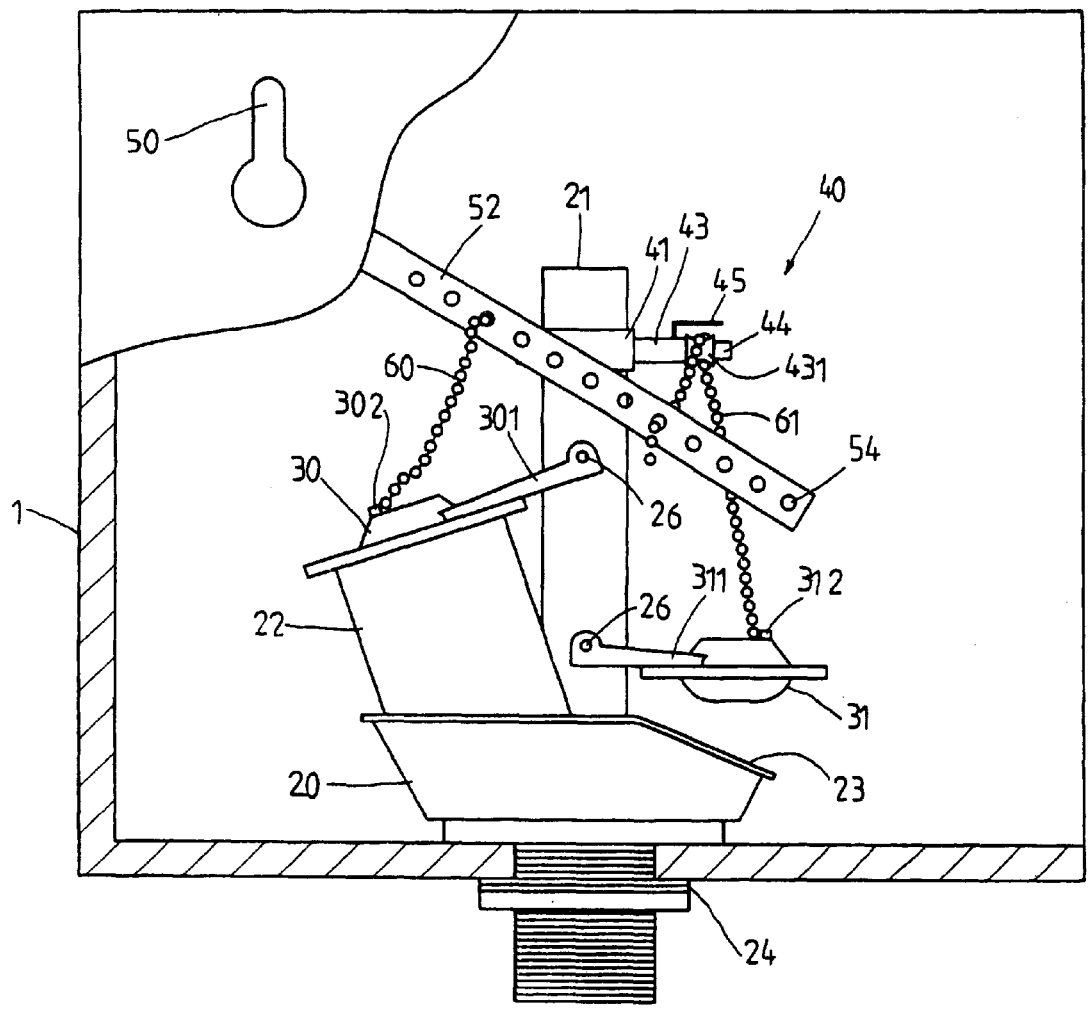
FIG. 9 is a schematic plan view showing the discharge of a large amount of water by the present invention.

As shown in FIGS. 8 and 9, when the flush handle 50 is activated, the control rod 52 is actuated such that the covers 30 and 31 are lifted by the chains 60 and 61, and that a small amount of water or a large amount of water is flushed.

The chains 60 and 61 are located by the clamps 70 such that no hand tool is used to install the clamps 70. In other words, two chains 60 and 61 are designed such that they can be installed in a do-it-yourself way.

The chains 60 and 61 can be adjusted in length such that the chains 60 and 61 can be used in the toilet water tanks of various sizes.

The service life span of the chains 60 and 61 is prolonged in view of the fact that the chains 60 and 61 are not made integrally with the clamps 70. In case of the damage of the clamps 70, only the damaged clamp 70 is replaced.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended

I claim:

1. A toilet tank comprising:

a water discharging seat provided in the center of a top thereof with an upright tube, a high water discharging port, and a low water discharging port, said seat further provided in a bottom thereof with a threaded tube for locating said seat in conjunction with a nut and for connecting a water discharging tube with a toilet, said upright tube provided in two side walls thereof with a columnar body contiguous to said high water discharging port and said low water discharging port;

two covers joined respectively with said high water discharging port and said low water discharging port, said covers provided with two parallel rod bodies such that said rod bodies are engaged at one end thereof with said columnar bodies of said upright tube for locating said covers, said covers provided respectively at a top thereof with a protrusion having a cross through hole;

a guide wheel member provided with a ring body which is fitted into said upright tube such that said upright tube is located in conjunction with a bolt, said ring body provided in an outer wall thereof with a rod and a guide wheel which is fastened pivotally with an end of said rod, said rod engaged at a top edge thereof with a locating frame such that said rod is extended to a top portion of said guide wheel, said guide wheel having an axis of rotation aligned with said rod;

a flush handle having a connection seat and a control rod, said connection seat being located in a through hole of said water tank such that said control rod is extended to a top of said water discharging seat, said connection seat having a nut retaining said flush handle, said control rod provided in a surface thereof with a plurality of locating holes, said flush handle pivotable about an axis transverse to said axis of rotation of said guide wheel;

a first chain and a second chain connecting respectively said covers with said control rod such that a bottom end of said first chain extends through said cross through hole of said protrusion of one of said covers, and that a top end of said first chain extends through one of said plurality of locating holes of said control rod, and further that a bottom end of said second chain extends through said cross through hole of said protrusion of the other one of said covers, and still further that a top end of said second chain extends through another of said plurality of locating holes of said control rod, said second chain extending over said guide wheel of said guide wheel member, each of said first and second chains having a plurality of bead bodies extending over and along a wire; and a plurality of clamps each having a flat straight portion and a curved portion in contact with said flat straight portion, said flat straight portion and said curved portion defining a guide slot at one end of the clamp through which said wire can pass, said flat straight portion and said curved portion defining a looped area positioned inwardly from an opening of said guide slot, said plurality of clamps being engaged with respective ends of said first and second chains such that said looped area of said clamps is positioned over said wire between adjacent pairs of bead bodies, and that said control rods retain said first and second chains a desired distance from said covers.

\* \* \* \* \*